Aug. 11, 1970 J. M. KASSON 3,524,138

ELECTRONIC COMMUTATOR EMPLOYING ANALOG GATES

3 Sheets-Sheet 1

Filed April 24, 1967

INVENTOR.
JAMES M. KASSON

BY Dugger, Peterson, Johnson & Westman
ATTORNEYS

ELECTRONIC COMMUTATOR EMPLOYING ANALOG GATES

Filed April 24, 1967 3 Sheets-Sheet 2

INVENTOR.
JAMES M. KASSON

BY Dugger, Peterson, Johnson & Westman
ATTORNEYS

Aug. 11, 1970 J. M. KASSON 3,524,138

ELECTRONIC COMMUTATOR EMPLOYING ANALOG GATES

Filed April 24, 1967 3 Sheets-Sheet 3

INVENTOR.
JAMES M. KASSON
BY
Dugger, Peterson, Johnson & Westman
ATTORNEYS

United States Patent Office
3,524,138
Patented Aug. 11, 1970

3,524,138
ELECTRONIC COMMUTATOR EMPLOYING ANALOG GATES

James M. Kasson, Palo Alto, Calif., assignor to Santa Rita Technology, Inc., Menlo Park, Calif. a corporation of Arizona Filed Apr. 24, 1967, Ser. No. 633,233
Int. Cl. H03k 17/76
U.S. Cl. 328—104 1 Claim

ABSTRACT OF THE DISCLOSURE

A plurality of analog gates have first linear input terminals connected to the various analog voltages that are to be sampled and their second control input terminals connected to logic circuitry. The logic circuitry provides a combinational pattern of control signals which activate the gates in a desired sequence so that successive output signals are provided. To avoid objectionable switching transients, an additional analog gate is provided that is activated to pass signals only when the logic circuitry is not being switched.

BACKGROUND OF THE INVENTION

Field of the invention

This invention relates generally to high-speed commutators, and pertains more particularly to an electronic commutator having less than a 100% duty cycle, the single output returning to a fixed value, such as ground potential, for a period of time after the sampling of each of a number of analog signals.

Description of the prior art

Mechanical commutating devices cannot operate at speeds much over 5 kHz. Although commutators utilizing semi-conductor switches are much faster than their mechanical counterparts, such commutating devices couple some of their drive signal into the output signal. Such a coupling produces spikes on the output terminal of the commutator, and these spikes are most objectionable at small signal levels and high-stepping rates. Where semiconductor switches with a low coupling of the drive signal are embodied in commutating devices, such devices are more costly than those with the high coupling mentioned above, other factors being equal. Hence, there is a need for a commutator that will produce a quality output signal that is better than the conventional commuator and an object of the present invention is to provide a fast, more accurate and less noisy commutator than heretofore produced at a comparable cost. More specifically, prior art commutators have resorted to a relatively expensive gate for each channel or input that is to be sampled, whereas my commutator employs a cheap gate for each channel input plus only one expensive gate. Consequently, where a number of signals are to be sampled, a large cost reduction can be effected when practicing the teachings of my invention.

SUMMARY OF THE INVENTION

Quite briefly, a clock feeds a decoding circuit in the form of a phase shifter. One output from the phase shifter controls a chain of scalers or divide-by-two circuits. The outputs of the scalers in turn control logic circuitry. The logic circuitry controls analog gates which are supplied with the analog input signals that are to be processed. A unity gain amplifier provides buffering and feeds a high quality analog gate which is controlled by the decoding or phase shifting circuit. This results in a single system output which may be connected to a cathode ray tube oscilloscope so that the signal is visually displayed for examination of photographing.

DESCRIPTION OF THE PREFERRED EMBODIMENT

Figure 2:
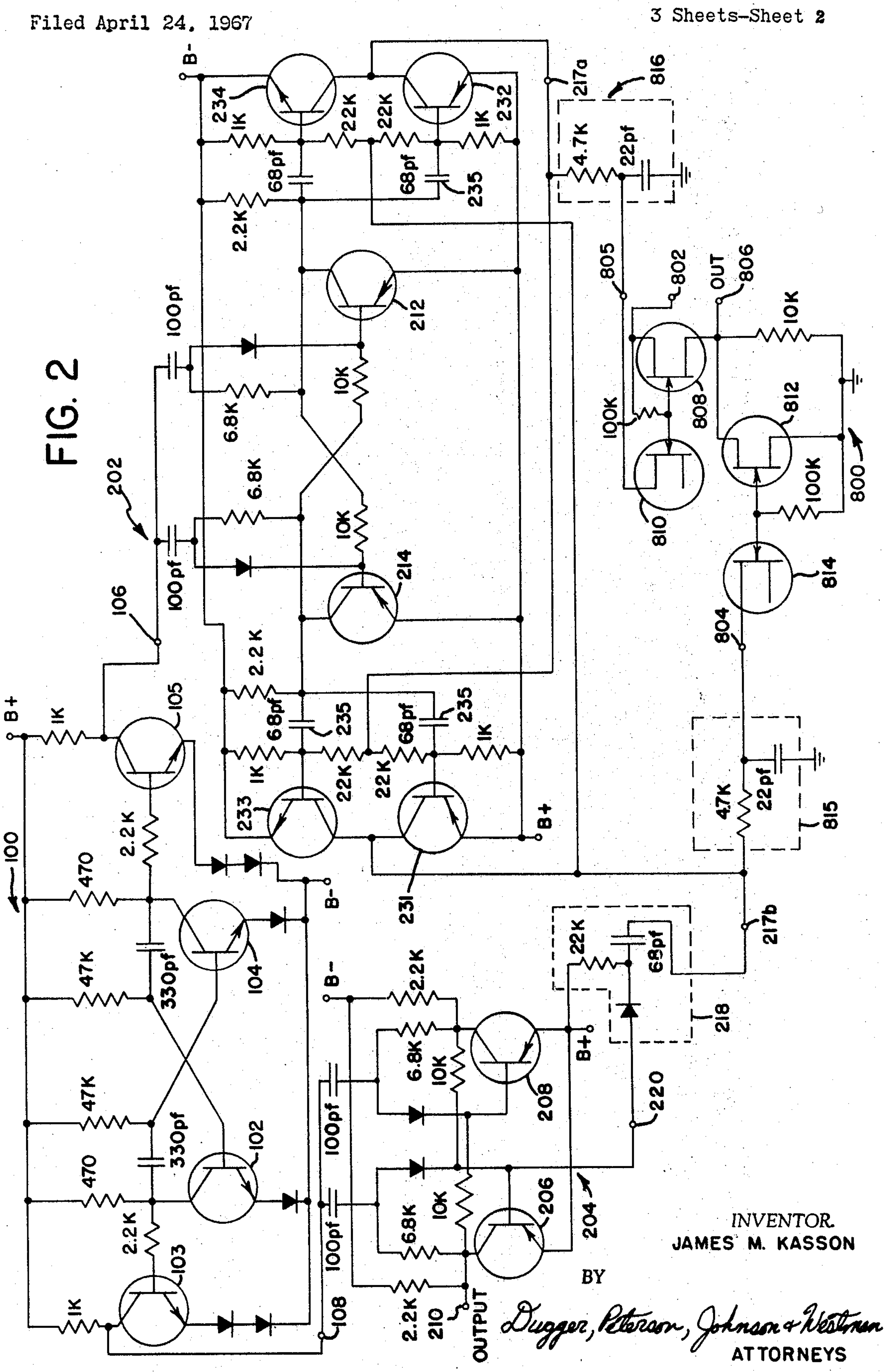
FIG. 2 is a schematic diagram of certain portions of the electronic commutator that are presented only in block form in FIG. 1.

Supervisory control is provided by a clock pulse source 100. From FIG. 2, it will be discerned that the source 100 is in the form of a multivibrator which includes a pair of transistors 102 and 104. As is conventional, these transistors are alternately driven into a conducting and non-conducting condition to provide a series of high frequency pulses. Output buffering is provided by two more alternately saturated and cut-off transistors 103 and 105. The clock source provides two output terminals 106 and 108 which are connected to a decoding circuit 200 that performs a phase shifting function. More specifically, the output terminal 106 is connected to a first flip-flop 202 and the output terminal 108 is connected to a second flip-flop 204. From FIG. 2, it will be seen that the flip-flop 202 includes a JK flip-flop with transistors 212 and 214 as active elements feeding a complementary RS flip-flop through capacitors 235. The complementary flip-flop, whose active elements are transistors 231, 232, 233 and 234, is used so that the rise and fall times of the outputs at **217*a* and 217*b* will be identical. Similarly, the JK flip-flop 204 includes a pair of transistors 206 and 208 and has an output terminal 210, the voltage on which is indicative of binary state of the device. Inasmuch as the polarity of the phase shifter 200 is dependent upon the starting states of both of the flip-flops 202 and 204, as well as the multivibrator constituting the clock pulse source 100, a negative differentiator 218 is connected between the output terminal 217*b* of he flip-flop 202 and a reset terminal 220 belonging to the flip-flop 204. As can be understood from FIG. 2, the negative differentiator 218 sends a pulse to the reset terminal 220 of the flip-flop 204 when the output terminal 217*b* of the flip-flop 202 goes down in voltage, thereby assuring that the output terminal 210 has its potential raised at this same instant. In the circuit configuration pictured in FIG. 2, the output at terminal 210 lags the output signal appearing at the terminal 217*b* by 90°. The addition of the negative differentiator 218 to the phase shifter 200 thus assures a lock-on in the desired phase relationship. Of course, if desired, the lock-on can be in a leading relationship in which the output signal at the terminal 210 is ahead of the signal appearing at the terminal 217*b***.

More will be said hereinafter concerning the role played by the output signal delivered at the terminals **217*a* and 217*b* of the flip-flop 204. At the present time, the path taken by the pulses presented at the output terminal 210 of the flip-flop 204 will be described. In this regard, these pulses are forwarded to a chain of scalers 300, more specifically, divide-by-two circuits. Here again, the scalers are actually JK flip-flops but perform a scaling function. The scalers 300 each have an input terminal 302 and a transfer terminal 304, as well as a pair of terminals 306 representing the particular binary state of each scaler. To distinguish, for a reason hereinafter made manifest, the terminals 306 of each scaler, the terminals 306** of the first scaler have been given the suffixes *a* and *b*, the second scaler the letters *c* and *d* and the third scaler the letters e and f. Quite obviously, in actual practice, a larger number of scalers would be employed in order to provide a larger number of sampling channels. However, the eight channels possible with the scaler chain that has been illustrated should suffice for an easy understanding of the operation of the commutator exemplifying my invention. Thus, the output terminals 306 are connected to logic circuitry labeled generally by the reference numeral 400, such logic circuitry being composed of various diodes 402 which provide a combinational pattern of control signals in a conventional fashion.

Before discussing the combinational pattern of control signals provided by the logic circuitry 400, attention is now directed to the inclusion of a plurality of analog gates 500, there being one such gate for each channel or analog signal to be sampled. Each analog gate 500 includes a field effect transistor 502, such as a 2N4360 one. Each gate is provided with a first input terminal 504, a second input terminal 506 and an output terminal 508. Since only one transistor 502 is employed in each gate 500, it will be appreciated that such gates 500 are relatively cheap. Because this transistor may also have relatively high "on" resistance and drain-gate capacitance, it will be apparent that a substantial cost reduction can be effected where many data channels are to be sampled.

To simplify matters, the input terminals 504 are shown connected to transducers labeled 600 which provide voltage signals, the magnitude of which are to be sampled. More specifically, the devices 600 are illustrated in the form of simple potentiometers 602 having wiper arms 604 which may be mechanically positioned in accordance with, say a number of industrial or laboratory conditions to be measured. Actually, my electronic commutator will find utility in a number of situations. For instance, it may be employed in the observation of analog cochlea excitations as a function of position along the basilar membrane, then constituting the commutator mentioned in U.S. Pat. No. 3,294,909 granted on Dec. 27, 1966 for "Electronic Analog Ear." Although not yet specifically mentioned, when the commutator is connected to a cathode ray tube oscilloscope, the present invention may be used to view the outputs of a multi-band spectrum analyzer or other devices which might require a time-sequential display. The second input terminals 506 of the various analog gates 500 are connected directly to the logic circuitry 400. At this point, it will be helpful to consider the table below which sets forth the various logic patterns that enable eight channels to be sampled:

| Channel number: | Logic pattern |
|---|---|
| 1 | *bdf* |
| 2 | *adf* |
| 3 | *bcf* |
| 4 | *acf* |
| 5 | *bde* |
| 6 | *ade* |
| 7 | *bce* |
| 8 | *ace* |

From the above table, it will be readily perceived that wherever the outputs 306*b*, 306*d* and 306*f* are energized with signals from the scalers 300, then the first analog gate 500 at the left will have a coincidence of input signals which will provide a signal at the output terminal 508 which is representative of the magnitude of the analog signal supplied by the particular device 600 to which the input terminal 504 of the first gate is connected. When output signals appear at the terminals 306*a*, 306*d* and 306*f*, then the logic circuitry 400 will provide a combinational pattern so as to energize the input terminal 506 of the next gate 500. This provides the sampling sequence. While only eight channels have been mentioned in the above table, it should be readily apparent that any number of channels can be sampled if the logic circuit 400 is expanded. Also, subcommutation may be restored to in order to accommodate more channels by adding a second logic stage with more gates 500.

Figure 1:
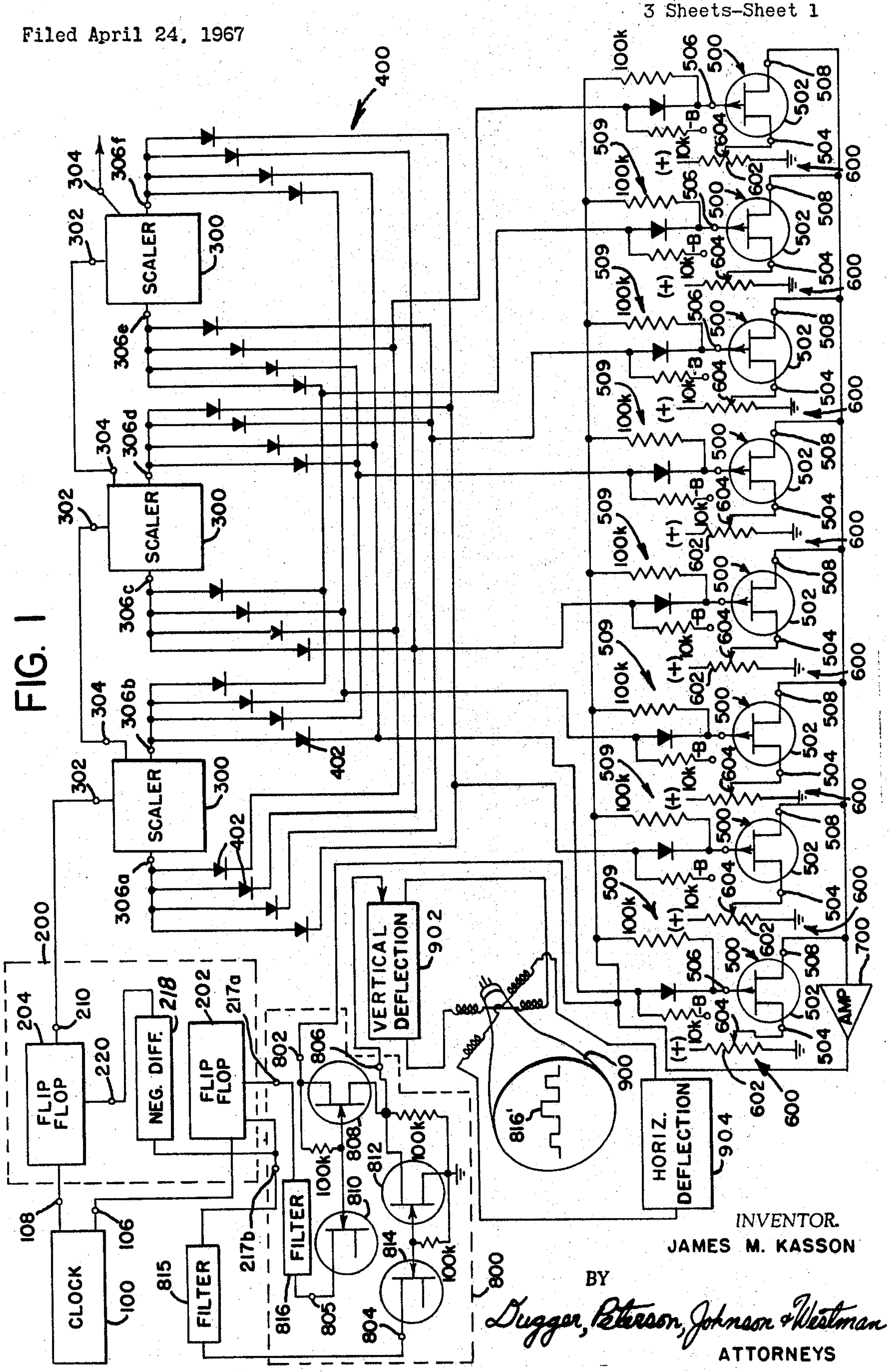
FIG. 1 is a combination block and schematic diagram of my electronic commutator.

It will be noted that a unity gain amplifier 700 has its input side connected to all of the output terminals 508 of the plurality of gates 500. The output of this amplifier is returned to the FET gates 506 through resistors 509 to assure low resistance in the closed position. The output side of the amplifier 700 is also connected directly to a high quality analog gate 800 which functions as an electronic switch and which is closed only at appropriate times. More specifically, it will be observed that the analog gate 800 has an analog input terminal 802, two central terminals 804 and 805 and an output terminal 806, the output terminal 806 actually serving as the system output from the commutator. The gate 800 is comprised of four field effect transistors, such as 2N4303, connected as shown in FIG. 1. The first transistor has been designated by the numeral 808, the second by the numeral 810, the third by the numeral 812 and the fourth by the numeral 814. Since there are four transistors in this instance, the gate 800 is considered to be a high quality or expensive gate as compared to a gate 500. These transistors should be of higher quality than those in gate 500. The drive circuitry necessitated by the gate 800 is much more complex than that required by the gates 500. It should be apparent that the transistor 808 when turned on by a coincidence of signals at its two input terminals 802, 804 becomes conductive so that signals from the amplifier 700 are allowed to pass therethrough. The transistor 810 serves as a field effect diode with characteristics similar to those of transistor 808. The transistor 812 provides a low impedance to ground when turned on, being triggered into its conductive state by the transistor 814 also acting as a field effect diode which is connected to line 804 which is the output of a low pass filter 815 whose input is connected to terminal 217*a* of the flip-flop 204, more specifically, to the side of the flip-flop 204 which is the alternate bistable state from that represented by the side connected to the output terminal 217*b*. Thus, the transistor 814 is back biased, causing transistor 812 to enter its conductive condition whenever the signal on the terminal 217*a* of the flip-flop 204 is low. Consequently, the output of the gate 800 is grounded whenever the gate is disabled or inactive so that it is impossible for any spurious signals to pass through this particular gate other than when it is enabled or activated by reason of coincident signals being applied to the input terminals 802, 804, which coincident signals are applied when there is no logic switching taking place.

Inasmuch as it is contemplated that my invention will find especial utility in allowing the simultaneous examination of a group of channels, a cathode ray tube oscilloscope 900 affords a ready means for accomplishing this aim. The output terminal 806 of the gate 800 is connected to the vertical deflection circuit 902 of the oscilloscope, the horizontal deflecting circuit 904 imparting the horizontal sweep or scan to the oscilloscope 900 in a conventional manner.

Figure 3:
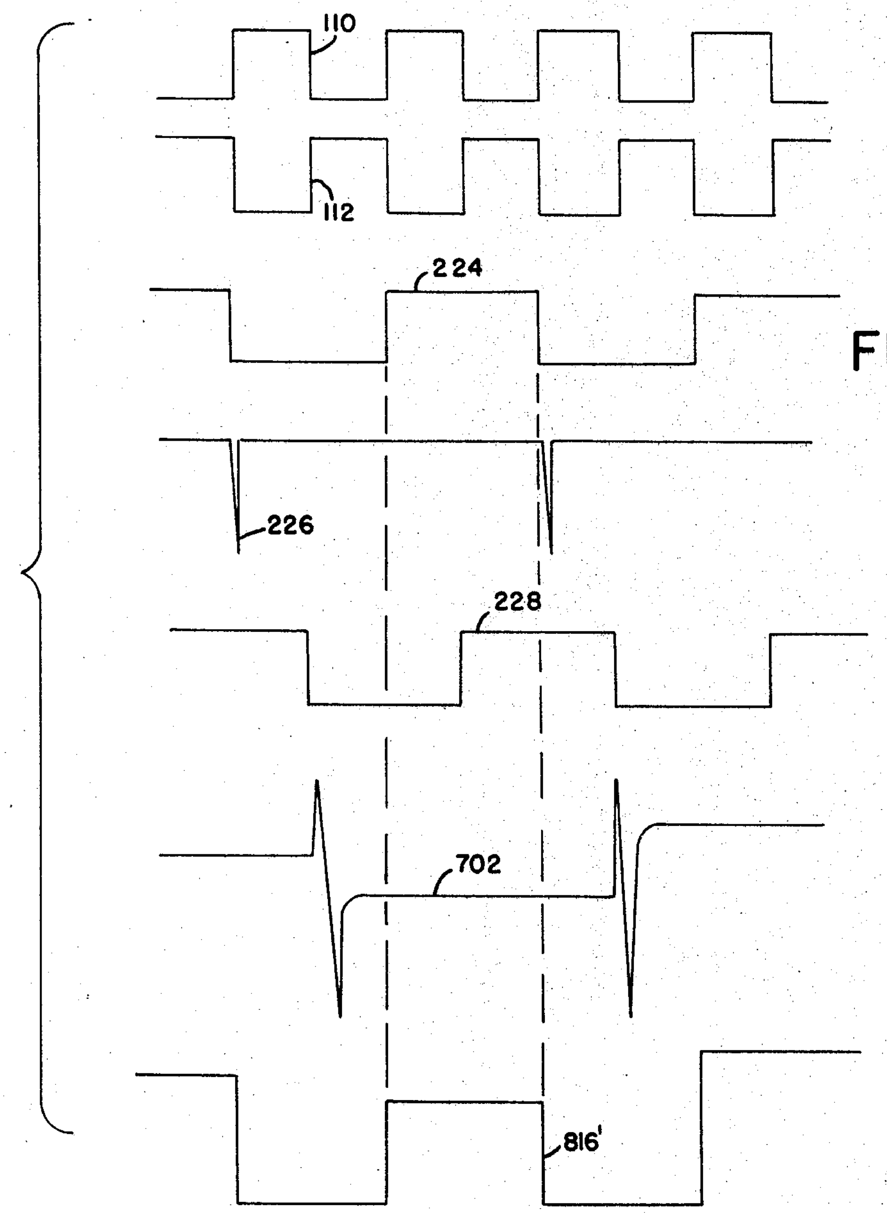
FIG. 3 is a group of waveforms that are encountered at certain locations within the commutator amplified in FIG. 1.

Although the information herein presented is believed readily apparent, it will be of assistance to refer to certain waveforms and these waveforms appear in FIG. 3. The first waveform is representative of the clock pulses delivered from the clock pulse source 100 via the output 106, this waveform being identified by the reference numeral 110. Since the output terminal 108 of the clock 100 provides a pulse 180° out of phase with the pulses constituting the waveform 110, the pulses constituting the waveform 112 appear immediately below the waveform 110 in FIG. 3. The output pulses from the terminal 217*b* have been labeled with the reference numeral 224. The waveform provided by the negative differentiator 218 has been given the reference numeral 226. Since the waveform at the output terminal 217*b* is leading the pulses forming the wave 228 by 90°, this relationship causes the gate 800 to be activated, the logic circuitry 400 not being changed or switched from one combinational pattern to another during this period. When the gate 800 is activated, the output terminal 217*b* belonging to the flip-flop 204 applies a biasing potential to the transistor 814 so as to cause this transistor to provide a low impedance path to ground so that any spikes during this period, if they should occurr, will not adversely affect the signal at the output terminal 806 and hence will not affect the display on the oscilloscope 900. The waveform 702 is representative of the signals appearing at the output terminals 508 and which are in turn applied to the input terminal 802 of the gate 800. The commutated output signal, which is representative of the magnitudes of the various analog voltages supplied by the devices 600, is illustrated by the waveform 816' and is free of any objectionable noise.

Having presented the foregoing information, a brief operational sequence should suffice to provide a complete understanding of the benefits to be derived from an electronic commutator of the envisaged type. Initially, it will be assumed that the scalers 300 have all been flipped so that a binary signal appears at the respective output terminals **306*b*, 306*d* and 306*f*. This results in the application of a control signal to the input terminal 506 of the first or left gate 500. Since an analog voltage is impressed on the input terminal 504 of this particular gate, then an output signal appears on the terminal 508. From the foregoing table, it can be seen that there is a switching that takes place under the supervisory control of the clock 100 and scalers 300. The phase shifter 200 assures that the high quality gate 800 is activated or armed only when the logic circuitry 400 is not being switched from one pattern to another. Only small transient voltages occur during the switching of gate 800, because its series-shunt construction using matched FET's causes the spikes from the two switching FET's to cancel each other. As the voltage on the gate of transistor 808 is going up, that on the gate of 812 is going down at the same rate, offering a very low impedance path through the drain gate junctions of both FET's back to the drive circuitry, not to the output 806. The field effect diodes 810 and 814 are included to ensure that the total capacitance from 805 to 806 is the same as that for 804 to 806, and good spike cancelling will occur. Transistors 810, 808, 812 and 814** should be of the same type, preferably matched for pinch-off voltage and drain-gate capacitance.

What is claimed is:

1. An electronic commutator comprising a plurality of analog gates each having a first input terminal, a second input terminal and an output terminal, means for applying respective analog signals to be sampled to said first input terminals, means for applying logical control signals to said second input terminals in combinational patterns, supervisory means for operating said logic means to cause successive changes from one combinational pattern to another so as to produce sequential signals at said output terminals which are representative of the magnitudes of the sampled signals, and means controlled by said supervisory means for providing an electrical path for the signals from said output terminals only when said logical control signals have reached a steady state after having been changed from the preceding pattern, last said path providing means including a flip-flop having a first output alternating between an "on" state and an "off" state at a rate equal to and delayed from said logical control signal applying means, said flip-flop having a second output complemental to said first output, an additional analog gate having an analog input terminal connected to the output terminals of said plurality of gates, said additional analog gate having first and second control terminals connected to respective said flip-flop outputs and an output terminal, said additional analog gate having a first switch controlled by said first control terminal for connecting said input terminal to said output terminal when an "on" state is applied to said first control terminal and a second switch controlled by said second control terminal for connecting said output terminal to ground potential when an "on" state is applied to said second input terminal, whereby said output terminal of said additional analog gate alternates between a signal corresponding to a sequential one of said analog gates and a signal at ground potential.

References Cited

UNITED STATES PATENTS

| | | | |
|---|---|---|---|
| 3,098,214 | 7/1963 | Windes et al. | 307—243 X |
| 3,422,360 | 1/1969 | Fletcher et al. | 307—243 X |
| 3,427,475 | 2/1969 | Wilkinson et al. | 307—243 |

JOHN S. HEYMAN, Primary Examiner

U.S. Cl. X.R.

307—223, 243, 251; 328—151, 154